(12) United States Patent
Mann et al.

(10) Patent No.: US 6,654,801 B2
(45) Date of Patent: *Nov. 25, 2003

(54) REMOTE SYSTEM ADMINISTRATION AND SEAMLESS SERVICE INTEGRATION OF A DATA COMMUNICATION NETWORK MANAGEMENT SYSTEM

(75) Inventors: Joseph F. Mann, Los Gatos, CA (US); Aravind Sitaraman, Santa Clara, CA (US); Mingqi Deng, Mountain View, CA (US); Leslie Alan Thomas, San Francisco, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,255

(22) Filed: Jan. 4, 1999

(65) Prior Publication Data

US 2002/0169867 A1 Nov. 14, 2002

(51) Int. Cl.[7] .............................................. G06F 15/173
(52) U.S. Cl. ...................... 709/224; 709/217; 709/223; 709/229; 709/315; 709/332
(58) Field of Search ................................ 709/217, 223, 709/224, 229, 332, 315, 316

(56) References Cited

U.S. PATENT DOCUMENTS 4,999,763 A * 3/1991 Ousborne .................... 364/140
5,109,486 A * 4/1992 Seymour ..................... 709/224

(List continued on next page.)

FOREIGN PATENT DOCUMENTS

| WO | 97/13382 | 10/1997 | ............ H04Q/7/22 |
| WO | 99/53408 | 10/1999 | ............ G06F/15/16 |

OTHER PUBLICATIONS

Carrel, D. et al., The TACACS= Protocol, Version 1.78, Cisco Systems, Inc., printed from ftp://ftp-eng.cisco.com/edweber/tac-rfc.1.78.txt on Oct. 23, 2000.

(List continued on next page.)

Primary Examiner—Saleh Najjar
(74) Attorney, Agent, or Firm—Thelen Reid & Priest,; David B. Ritchie LLP

(57) ABSTRACT

A method for providing remote management and maintenance of a node or service within a data communications network that is activated by the data communications network management system's receipt of signals of an abnormal condition at a node or service or failure to receive operational status signals from a node or service. A control adapter running on a node within a Point of Presence is started. The control adapter is capable of starting all service adapters associated with all services running on the node. Operational status signals and abnormal condition signals are transmitted from the control adapter and service adapters on to an information bus. If a network management control host receives abnormal condition signals, notification is sent to a remote system administrator that alerts of an error experienced by a node or service. If a network management control host fails to receive operational status signals, notification is sent to a remote system administrator that no signals are being received from a node or service. The system administrator can take appropriate remote action to rectify the problem. The integration of a manually started node or service into a data communications network management system is achieved by manually implementing, at a Point of Presence within a data communications network, a node or service that has an adapter running on it and is in communication with an information bus. The node or service begins signalling operational status upon implementation. These signals are not recognized by network management control hosts. The network management control host transmits signals asking the newly started node or service for identification. The node or service receives the identity request and transmits signals back to the network management control host.

33 Claims, 5 Drawing Sheets

U.S. PATENT DOCUMENTS

| | | | | |
|---|---|---|---|---|
| 5,241,594 | A | 8/1993 | Kung | 380/4 |
| 5,276,801 | A | 1/1994 | Heyen et al. | 395/162 |
| 5,283,783 | A | 2/1994 | Nguyen et al. | 370/16.1 |
| 5,287,103 | A | 2/1994 | Kasprzyk et al. | 340/825.52 |
| 5,361,250 | A | 11/1994 | Nguyen et al. | 370/16.1 |
| 5,367,635 | A | 11/1994 | Bauer et al. | 395/200 |
| 5,442,791 | A * | 8/1995 | Wrabetz et al. | 709/203 |
| 5,491,791 | A * | 2/1996 | Glowny et al. | 714/37 |
| 5,555,244 | A | 9/1996 | Gupta et al. | 370/60.1 |
| 5,561,769 | A | 10/1996 | Kumar et al. | 395/200.05 |
| 5,570,361 | A | 10/1996 | Norizuki et al. | 370/60.1 |
| 5,581,478 | A | 12/1996 | Cruse et al. | 364/505 |
| 5,592,538 | A | 1/1997 | Kosowsky et al. | 379/93 |
| 5,610,910 | A | 3/1997 | Focsaneanu et al. | 370/351 |
| 5,621,721 | A | 4/1997 | Vatuone | 370/16 |
| 5,655,077 | A | 8/1997 | Jones et al. | 395/187.01 |
| 5,671,354 | A | 9/1997 | Ito et al. | 395/187.01 |
| 5,673,265 | A | 9/1997 | Gupta et al. | 370/432 |
| 5,678,006 | A | 10/1997 | Valizadeh et al. | 395/200.02 |
| 5,684,950 | A | 11/1997 | Dare et al. | 395/187.01 |
| 5,694,547 | A * | 12/1997 | Subramanian et al. | 709/224 |
| 5,699,521 | A | 12/1997 | Iizuka et al. | 395/200.15 |
| 5,715,394 | A | 2/1998 | Jabs | 395/200.11 |
| 5,717,604 | A | 2/1998 | Wiggins | 364/514 |
| 5,729,546 | A | 3/1998 | Gupta et al. | 370/434 |
| 5,740,176 | A | 4/1998 | Gupta et al. | 370/440 |
| 5,748,882 | A | 5/1998 | Huang | 395/184.01 |
| 5,751,966 | A | 5/1998 | Dauerer et al. | 395/200.54 |
| 5,764,756 | A | 6/1998 | Onweller | 379/242 |
| 5,787,253 | A | 7/1998 | McCreery et al. | 395/200.61 |
| 5,799,017 | A | 8/1998 | Gupta et al. | 370/419 |
| 5,812,529 | A | 9/1998 | Czarnik et al. | 370/245 |
| 5,812,750 | A * | 9/1998 | Dev et al. | 714/4 |
| 5,815,665 | A | 9/1998 | Teper et al. | 395/200.59 |
| 5,835,727 | A | 11/1998 | Wong et al. | 395/200.68 |
| 5,838,682 | A | 11/1998 | Dekelbaum et al. | 370/401 |
| 5,838,683 | A | 11/1998 | Corley et al. | 370/408 |
| 5,852,812 | A | 12/1998 | Reeder | 705/39 |
| 5,857,074 | A | 1/1999 | Johnson | 395/200.47 |
| 5,862,404 | A * | 1/1999 | Onaga | 395/828 |
| 5,867,495 | A | 2/1999 | Elliott et al. | 370/352 |
| 5,889,774 | A | 3/1999 | Mirashrafi et al. | 370/352 |
| 5,898,780 | A | 4/1999 | Liu et al. | 380/25 |
| 5,913,037 | A | 6/1999 | Spofford et al. | 395/200.56 |
| 5,922,051 | A | 7/1999 | Sidey | 209/223 |
| 5,926,463 | A * | 7/1999 | Ahearn et al. | 370/254 |
| 5,944,824 | A | 8/1999 | He | 713/201 |
| 5,958,009 | A * | 9/1999 | Friedrich et al. | 709/224 |
| 5,968,116 | A * | 10/1999 | Day, II et al. | 709/202 |
| 5,987,232 | A | 11/1999 | Tabuki | 395/187.01 |
| 5,991,810 | A | 11/1999 | Shapiro et al. | 709/229 |
| 5,991,828 | A | 11/1999 | Horie et al. | 710/8 |
| 6,003,078 | A * | 12/1999 | Kodimer et al. | 709/224 |
| 6,009,103 | A | 12/1999 | Woundy | 370/401 |
| 6,018,619 | A | 1/2000 | Allard et al. | 395/200.54 |
| 6,021,262 | A | 2/2000 | Cote et al. | 395/185.01 |
| 6,021,429 | A | 2/2000 | Danknick | 709/208 |
| 6,021,496 | A | 2/2000 | Dutcher et al. | 713/202 |
| 6,023,507 | A * | 2/2000 | Wookey | 380/21 |
| 6,023,724 | A | 2/2000 | Bhatia et al. | 709/218 |
| 6,026,087 | A | 2/2000 | Mirashrafi et al. | 370/389 |
| 6,026,440 | A | 2/2000 | Shrader et al. | 709/224 |
| 6,026,441 | A | 2/2000 | Ronen | 709/227 |
| 6,072,857 | A * | 6/2000 | Venkateshwaran et al. | 379/9 |
| 6,091,951 | A | 7/2000 | Sturniolo et al. | 455/432 |
| 6,092,196 | A | 7/2000 | Reiche | 713/200 |
| 6,094,681 | A * | 7/2000 | Shaffer et al. | 709/224 |
| 6,098,116 | A * | 8/2000 | Nixon et al. | 710/8 |
| 6,105,061 | A * | 8/2000 | Nakai | 709/223 |
| 6,119,160 | A | 9/2000 | Zhang et al. | 709/224 |
| 6,133,846 | A * | 10/2000 | Birkedahl et al. | 370/225 |
| 6,138,249 | A * | 10/2000 | Nolet | 714/25 |
| 6,141,687 | A | 10/2000 | Blair | 709/225 |
| 6,148,410 | A * | 11/2000 | Baskey et al. | 714/4 |
| 6,167,358 | A * | 12/2000 | Othmer et al. | 702/188 |
| 6,192,034 | B1 * | 2/2001 | Hsieh et al. | 370/241 |
| 6,195,760 | B1 * | 2/2001 | Chung et al. | 714/4 |
| 6,212,175 | B1 * | 4/2001 | Harsch | 370/338 |
| 6,226,679 | B1 * | 5/2001 | Gupta | 709/230 |
| 6,236,999 | B1 * | 5/2001 | Jacobs et al. | 707/10 |
| 6,266,781 | B1 * | 7/2001 | Chung et al. | 714/4 |
| 6,272,537 | B1 * | 8/2001 | Kekic et al. | 709/223 |
| 6,282,175 | B1 * | 8/2001 | Steele et al. | 370/254 |
| 6,338,112 | B1 * | 1/2002 | Wipfel et al. | 710/269 |
| 6,353,898 | B1 * | 3/2002 | Wipfel et al. | 714/48 |

OTHER PUBLICATIONS

Active Software, Inc., "Active Software's Integration System", printed from http://www.activesw.com/products/products.html, on Jul. 24, 1998.

Cisco Systems, Inc., "CiscoDNS/DHCP Manager V.1.1", printed from http://www.combinet.com/warp/public/751/dnsmg/dnsmg$_{13}$ ds.htm, on Sep. 10, 1998, 4 pages.

Cisco Systems, Inc., "Cisco DNS/DHCP Manager V.1.1", printed from http://www.combinet.com/warp/public/751/dnsmg/dnsmg_pa.htm, on Sep. 10, 1998, 7 pages.

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

IBM, "IBM introduces new subscriber management system for Internet service providers", Dec. 2, 1998, IBM News, p. 1.

Network Registrar, "Hot Products & Solutions—IP Address Management: A White Paper", American Internet Corporation, Bedford, MA, printed from http://www.american.com/ip-mgmt.html, on Jul. 24, 1998.

Rigney, et al., "Remote Authentication Dial In User Service (RADIUS)", Network Working Group, RFC 2138, Apr. 1997, pp. 1–57.

* cited by examiner

REMOTE SYSTEM ADMINISTRATION AND SEAMLESS SERVICE INTEGRATION OF A DATA COMMUNICATION NETWORK MANAGEMENT SYSTEM

BACKGROUND OF THE INVENTION

1. Field of the Invention

The present invention relates to a method and apparatus for managing and maintaining a data communications network. More particularly, the present invention relates to a method and apparatus for distributed data communications network management having the capability to remotely manage the recovery of service components experiencing errors or failures and the capability to incorporate manually started new service components into the data communications network.

2. The Background

The ability to provide data communications networking capabilities to the personal user and the professional community is typically provided by telephone companies (Telcos) or commercial Internet Service Providers (ISPs) who operate network access points along the information superhighway. Network access points which are commonly referred to as Points of Presence or PoPs are located within wide area networks (WAN) and serve to house the network interfaces and service components necessary to provide routing, bridging and other essential networking functions. It is through these network access points that the user is able to connect with public domains, such as the Internet and private domains, such as the user's employer's intranet.

The ISPs and Telcos maintain control of the network interfaces and services components comprising the data communications network at locations commonly referred to as Network Operation Centers (NOCs). It is here, at the NOCs, where the ISPs and Telcos employ service administrators whose task is to maintain and manage a finite sector of the overall data communications network. Managing and maintaining the interfaces and services that encompass the network is complicated. The interfaces and services that a system administrator has responsibility for are not confined to the NOC, but rather remotely dispersed throughout the PoPs. For example, the NOC may be located in San Jose, Calif. and the services and interfaces for which the system administrator has responsibility for may be located at PoPs in San Francisco, Calif., Los Angeles, Calif. and Seattle, Wash. Part of the challenge with system administration is the ability to identify problems and potential problems in a timely manner. With a system distributed world-wide, having an ever-growing number of hosts and servers, it becomes nearly impossible and economically undesirable to have system administrators providing constant surveillance for all the components.

It is the common knowledge of anyone who has used computers in a network environment that problems related to the interfaces and services are the rule and not the exception. The vast majority of these problems are minor in nature and do not require the system administrator to take action. Networks have been configured in the past so that these minor errors are self-rectifying; either the interface or service is capable of correcting its own error or other interfaces or services are capable of performing a rescuing function. In other situations the problems that are encountered within the network are major and require the system administrator to take action; i.e., physically rerouting data traffic by changing interfaces and services.

It is the desire of the service providers to have a maintenance and management system for a data communications network that allows the system administrator to manage and maintain the data communications network remotely. The move is towards hands-off system administration that affords the service providers the capability to manage data communications networks without the need to have system administrators physically located at the NOC's management operation host on a 24 hour basis. This type of remote system administration can only be achieved if the management system has self-rectifying capability and the know-how to remotely notify the system administrator when severe errors or failures occur within the services. When major errors or service component failures occur, the system administrator must be notified in a prompt and efficient manner so that immediate action can be taken. The objective of the network management system should be to provide for a mechanism whereby system administrators can be remotely notified on an around-the-clock basis whenever a specified severe error may occur, has occurred or when a service failure has occurred. Once the system administrator is notified remotely then the system administrator can adjust the data communications network accordingly via remote network management system access, use of a node interactive access application such as Telnet or an equivalent mechanism.

Additionally, a comprehensive data communications network management system will benefit from being able to acknowledge and acquire information at the operation center host from network services and interfaces that are manually added to the network or manually started. Manually, in this sense, refers to services that are started or added at one of the numerous PoPs in the distributed data communications network without a command to do so being issued from the network management operation center. It would be highly beneficial for the service provider to automatically add this service to the management system without having to physically acquire data related to that service and manually input the data into the network management system. When services can be added to the distributed data communications network management system in a seamless manner it furthers the objective of limiting system administrator interface with the network management system. In this manner the service provider is able to maintain and manage the data communications network without the need for having more personnel than necessary to monitor and manipulate the network on an ongoing basis.

BRIEF DESCRIPTION OF THE INVENTION

A method for providing remote management and maintenance of a node or service within a data communications network that is initiated by the data communications network management system's failure to receive operational status signals from a node or service. A control adapter running on a node within a Point of Presence is started. The control adapter is capable of starting all service adapters associated with all services running on the node. Operational status signals are transmitted from the control adapter and service adapters on to an information bus. If a network management control host fails to receive operational status signals, notification is sent to a remote system administrator that no signals are being received from a node or service. The system administrator can take appropriate remote action to rectify the problem.

In another aspect of the invention, remote management and maintenance of a node or service within a data communications network is initiated by the data communications network management system's receipt of abnormal condition signals from a node or service. A control adapter running on a node within a Point of Presence is started. The control adapter is capable of starting all service adapters associated with all services running on the node. Abnormal condition signals are transmitted from the control adapter and service adapters on to an information bus when warnings and errors are encountered. If a network management control host receives abnormal condition signals that dictate remote system administrator notification, then notification is sent to a remote system administrator that abnormal conditions exist at the node or the service. The system administrator can take appropriate remote action to rectify the problem.

In another aspect of the invention, integration of a manually started node or service into a data communications network is achieved. A node or service is manually started at a Point of Presence within a data communications network. The node or service has an adapter running on it and is in communication with an information bus. The node or service begins signalling operational status upon implementation. These signals are received by a network management control host that fails to recognize the identity of the signals. The network management control host transmits signals asking the newly started node or service for identifying information. The node or service receives the identity request and transmits signals back to the network management control host with specific requested identification information. The network management control host stores this information for identification purposes and later performance analysis.

In yet another aspect of the invention, a network management control host comprises a network management application started on the host at a network operation center. The network management application is in communication with a database adapter and a database. The database adapter is in communication with an information bus. A remote system administrator notifier is in communication with the network management application and the database adapter and provides for remote notification of the system administrator if signals are received related to an abnormal condition at a node or a service or if operational status signals from a node or service are not received.

DETAILED DESCRIPTION OF THE PRESENT INVENTION

Those of ordinary skill in the art will realize that the following description of the present invention is illustrative only and is not intended to be in any way limiting. Other embodiments of the invention will readily suggest themselves to such skilled persons from an examination of the within disclosure.

In accordance with a presently preferred embodiment of the present invention, the components, processes and/or data structures are implemented via devices implementing C++ programs running on an Enterprise 2000™ server running Sun Solaris™ as its operating system. The Enterprise 2000™ server and Sun Solaris™ operating system are products available from Sun Microsystems, Inc of Mountain View, Calif. Additionally, the Network Control Console (NCC) of the presently preferred embodiment of the present invention is implemented using a Windows™ based operating system. The Windows™ operating system is a product available from Microsoft Corporation of Redmond, Wash. Different implementations may be used and may include other types of operating systems, computing platforms, computer programs, firmware and/or general purpose machines. In addition, those of ordinary skill in the art will readily recognize that the devices of a less general purpose nature, such as hardwired devices, devices relying on FPGA (Field Programmable Gate Array) or ASIC (Application Specific Integrated Circuit) technology, or the like, may also be used without departing from the scope and spirit of the inventive concepts herein disclosed.

Figure 1:
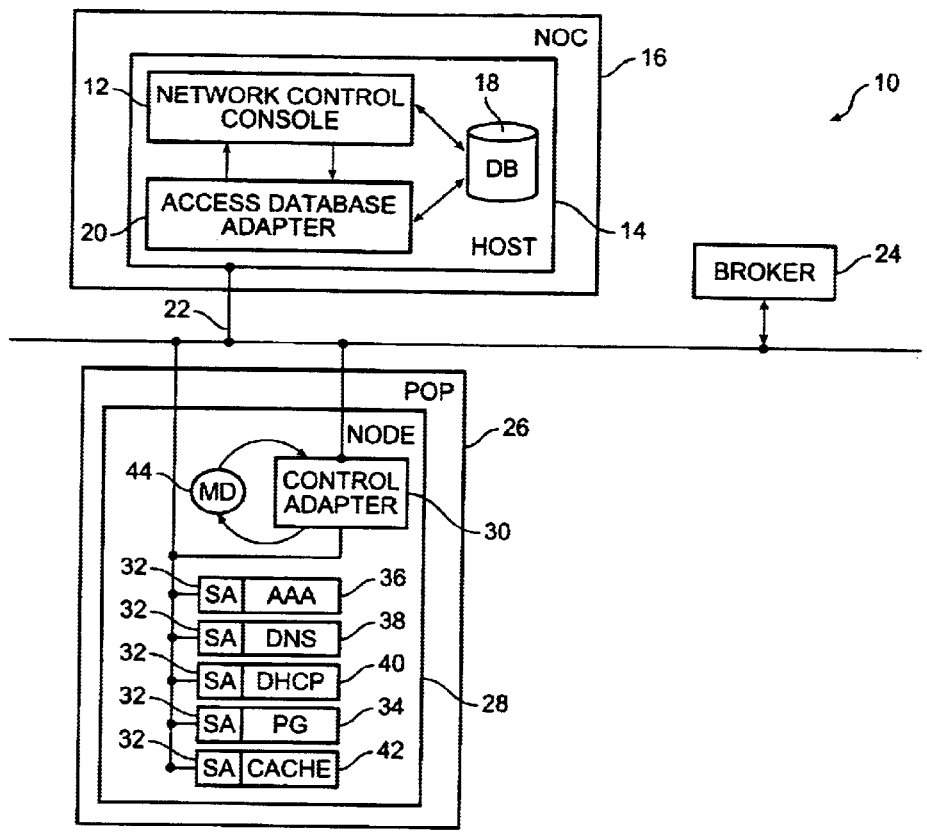
FIG. 1 is a schematic drawing of a management and maintenance system for a data communications network, in accordance with a presently preferred embodiment in the present invention.

Referring to FIG. 1, shown is a schematic diagram of a data communications network 10 incorporating the network management system of a presently preferred embodiment of the present invention. A network control console (NCC) 12 is physically located on a host 14 within a Network Operation Center (NOC) 16. The NCC 12 is an application program running on the host 14. The NCC 12 monitors and manages the data network management system and serves as the communication interface between the data network management system and a system administrator. A system administrator is an individual employed by a network service provider who maintains a portion of the overall data communications network 10. The NCC 12 is in communication with a database 18 and a database adapter 20.

The database 18 and database adapter 20 can run on the same host 14 as the NCC 12, as depicted in FIG. 1, or the database 18 and the database adapter 20 can be located on other remote devices. The database 18 stores information related to the various components and services comprising the data communications network 10 being managed. The system administrator accesses the information in the database 18, as needed, via the network control console 12 to perform the overall network management task. The database adapter 20 is in communication with both the database 18 and the NCC 12. This adapter, and other adapters in the invention, provide bi-directional mapping of information between the NCC 12 and other services comprising the data communications network 10. Adapters, such as the database adapter 20 subscribe to and publish events. An event is an independent entity that contains an unspecified amount of, generally, non-time critical information. For example, the database adapter 20 receives commands from the NCC 12 to publish an event. The information contained in the event may be found in the NCC's request or the database adapter 20 may communicate with the database 18 to find the required information. A detailed discussion of the specific events pertaining to the presently preferred embodiments of the present invention and the information found in those events is provided later in this disclosure. The event is then published to other services and components within the data network management system across an information bus 22.

The information bus 22 that serves as the transportation medium for a presently preferred embodiment of the present invention can be Common Object Request Broker Architecture (CORBA)-based. The CORBA-based information bus is capable of handling the communication of events to and from objects in a distributed, multi-platform environment. The concept of a CORBA-based information bus is well known to those of ordinary skill in the art. Other acceptable information-bus architectures can be used as are known by those of ordinary skill in the art.

CORBA provides a standard way of executing program modules in a distributed environment. A broker, therefore, may be incorporated into an Object Request Broker (ORB) within a CORBA compliant network. To make a request of an ORB, a client may use a dynamic invocation interface (which is a standard interface which is independent of the target object's interface) or an Object Management Group Interface Definition Language (OMG IDL) stub (the specific stub depending on the interface of the target object). For some functions, the client may also directly interact with the ORB. The object is then invoked. When an invocation occurs, the ORB core arranges so a call is made to the appropriate method of the implementation. A parameter to that method specifies the object being invoked, which the method can use to locate the data for the object. When the method is complete, it returns, causing output parameters or exception results to be transmitted back to the client.

Figure 2:
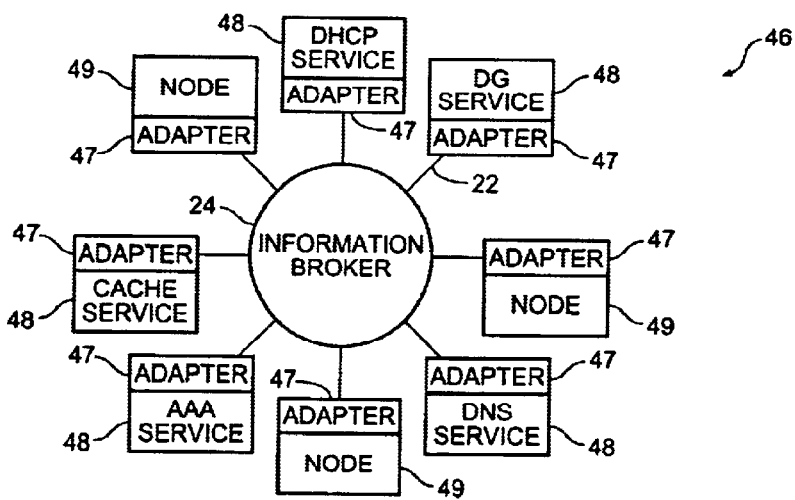
FIG. 2 is a schematic drawing of a Enterprise Application Integration (EAI) system highlighting the relationship between an information broker and adapters, in accordance with a presently preferred embodiment of the present invention.

In accordance with a presently preferred embodiment of the present invention an Enterprise Application Integration (EAI) system is used to broker the flow of information between the various services and adapters comprising the data network management system of the present invention. The implementation of EAI systems in networking environments are well known by those of ordinary skill in the art. An example of an EAI system that can be incorporated in the presently preferred invention is the ActiveWorks Integration System, available from Active Software of Santa Clara, Calif. As shown in FIG. 2, such an EAI system 46 uses information broker 24 as the hub of the system. The information broker 24 acts as the central control and storage point for the system. The information broker 24 can reside on a server (not shown in FIG. 2) and serves to mediate requests to and from networked clients; automatically queuing, filtering and routing events while guaranteeing delivery. The information broker 24 is capable of storing subscription information and using such subscription information to determine where published information is to be sent. Referring back to FIG. 1, the information broker 24 is shown as being located at a point along the information bus 22. In most instances the, broker will be located within the same NOC 16 as the host 14 that runs the NCC 12 application. Another key feature to the EAI system 46, shown in FIG. 2 is the use of adapters 47 that allow users of the EAI system 46 to integrate diverse applications and other information when using the integration system. Adapters 47 provide bi-directional mapping of information between the an application's native format and integration system events, enabling all custom and packaged applications, databases, and Internet and extranet applications to exchange information. As shown in FIG. 2 the adapters 47 run on the various services 48 and network nodes 49 from which information is published and subscribed on to information bus 22 that has its hub at the broker 24. As is well known by those of ordinary skill in the art, a node refers to a host computer or server, in this instance, located at a PoP within the data communications network.

Referring back to FIG. 1 information bus 22 serves to handle communication requests and responses originating from Point of Presence (POP) 26, NOC 16 or other PoPs and/or NOCs within the data communications network 10. The PoP 26 is one of many PoPs with which the information bus 22 is in communication. Located within PoP 26 is a host or node 28. The node 28 is in communication with the information bus 22 through control adapter 30 and one or more service adapters 32 that are connected with the various services that are used on the node 28. PoPs, such as the simplified example shown in FIG. 1, are located throughout the distributed data communications network. PoPs will generally comprise more services than are shown in FIG. 1 and may include more than one node handling network management interface capabilities. It is the task of the network management system of this invention to manage all the services and interfaces housed at the numerous PoPs comprising the comprehensive network.

By way of example, node 28 of FIG. 1 is configured with protocol gateway service 34, Authentication, Authorization and Accounting (AAA) service 36, Domain Name System (DNS) service 38, Dynamic Host Configuration Protocol (DHCP) service 40 and cache service 42. Node 28 may have single instances of each service running or may have multiple instances of a service running. Additionally, node 28 is not confined to having only one service component of a specific type associated with it, i.e., node 28 can be configured to have two or more AAA services, DNS services, DHCP services . . . etc. in communication with node 28. Those of ordinary skill in the art will appreciate that the services shown are not intended to be limiting and that other services and other service configurations can be used without departing from the inventive concepts herein disclosed. Not all services need to be running at each PoP and a PoP may comprise one or more host computers on which one or more of the services may be running.

The protocol gateway service 34 is used to couple the network user to the data communications network. The protocol gateway service 34 functions as an interface that allows access requests received from a user or client computer to be serviced using components that may communicate using different protocols. A typical protocol gateway service may be able to support different user access methodologies, such as dial-up, frame relay, leased lines, ATM (Asynchronous Transfer Mode), ADSL (Asymmetric Digital Subscriber Line) and the like.

Used in conjunction with the protocol gateway service 34, the AAA service 36 performs user authorization and user accounting functions. The AAA service 36 stores user profile information and tracks user usage. The profile information stored in the AAA service 36 is forwarded to the protocol gateway service 34 when a network user desires network access.

The DNS service 38 is used to return Internet Protocol (IP) addresses in response to domain names received from a client, a network access server (NAS) or other services associated with the NAS or client. By way of example, if DNS service 38 receives a domain name from a requesting service, it has the capability to locate the associated IP address from within the memory of the DNS service 38 (or another DNS service) and return this IP address to the requesting service. Alternately, DNS service 38 can be used to return domain names in response to IP addresses received from a client, a NAS or other services associated with the NAS or client. By way of example, if DNS service 38 receives an IP address from a requesting service, it has the capability to locate the associated domain name from within the memory of DNS service 38 or another DNS service) and return this domain name to the requesting service.

The DHCP service 40 is used as a dynamic way of assigning IP addresses to the network users.

The cache, or attribute memeory service 42 is a simple cache performing data storage functions.

Each of these services communicates with the information bus 22 utilizing a service adapter 32 interface. The service adapter 32 subscribes to and publishes various events on the information bus 22. The service adapter 32 is configured so that it subscribes to events published by the database adapter 20 of the NCC 12 and the control adapter 30 of the node 28. The service adapter 32 also publishes events to the database adapter 20 of the NCC 12 and the control adapter 30 of node 28.

A control adapter 30 is running on node 28. A control adapter 30 runs on all nodes that have services that require managing by the NCC 12. The control adapter 30 monitors the state and status of the node 28 as well as services running on the node 28 and allows the system administrator to remotely start and stop services on the node 28. Additionally, the control adapter 30 serves to insure that the services within node 28 remain viable. Control adapter 30 polls the services on a prescribed time basis to insure that all specified services remain operational. The system administrator may define the prescribed polling interval. If the results of the polling operation determine that a particular service has failed then the control adapter 30 initiates an automatic restart process. If the restart process fails to revive the service, the control adapter 30 will again initiate the automatic restart process. The system administrator will determine how many unsuccessful automatic restart processes will be undertaken before the NCC 12 determines that a service has died or the control adapter 30 sends an event to the NCC 12 that notifies the system administrator that the attempt to restart a service was unsuccessful. In this instance, the event that is forwarded to the NCC 12 via the information bus 22 is an exception event. A detailed discussion of an exception event and other events published by and subscribed to by the control adapter 30, as they pertain to presently preferred embodiments of the present invention, is provided later in this discussion.

A master daemon 44 is in communication with the control adapter 30. The function of the master daemon is to insure that the control adapter 30 remains viable. The master daemon 44 starts the control adapter 30 initially and restarts the control adapter 30 if a failure occurs. In this sense, the master daemon 44 is defined as a parent process and the control adapter 30 is the child process of the master daemon 44. The master daemon 44 is an application that is kept extremely simple so as to minimize the likelihood that it will ever crash.

Figure 3:
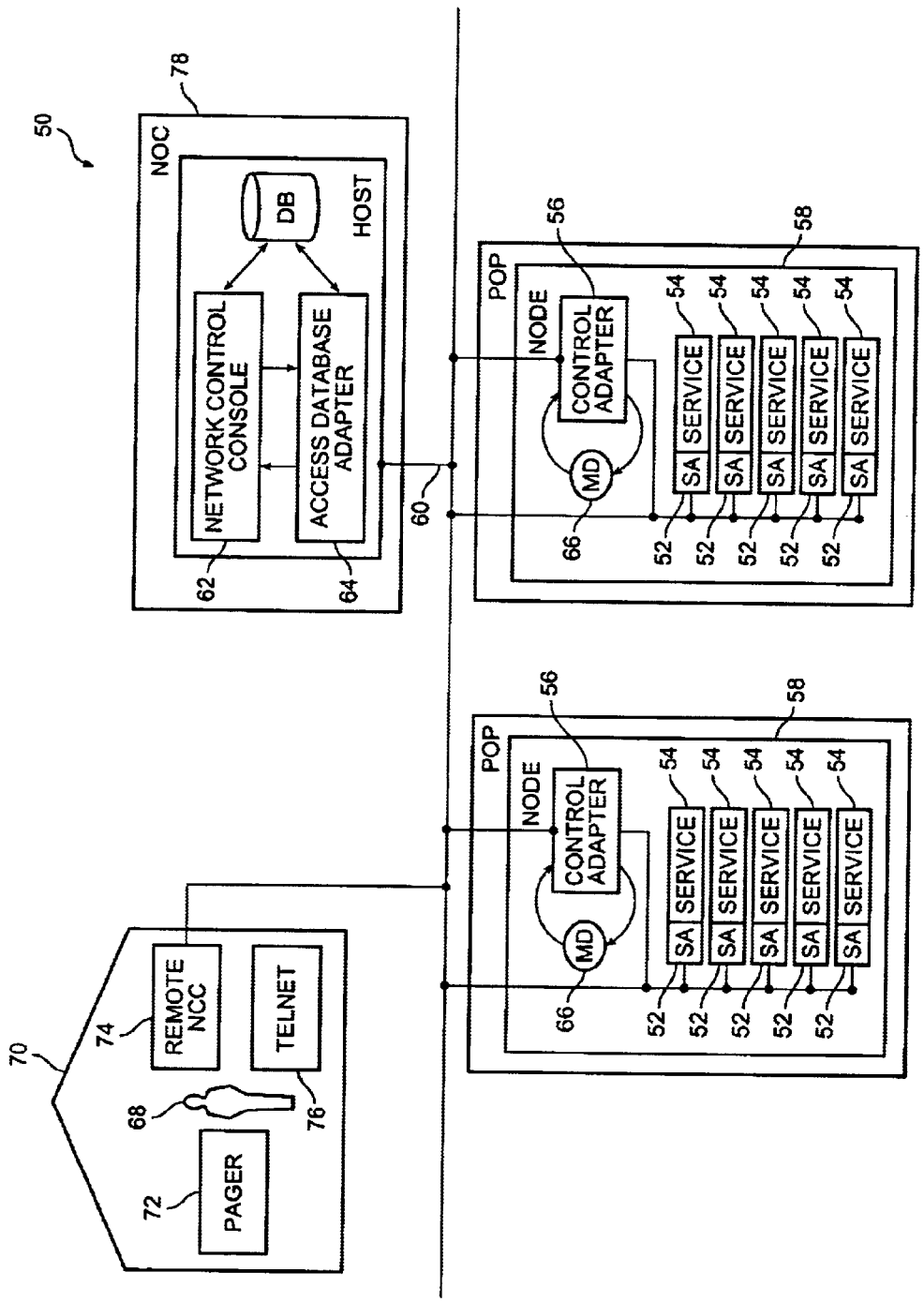
FIG. 3 is a schematic drawing of a management and maintenance system for a data communications network having remote system administration capability, in accordance with a presently preferred embodiment of the present invention.

FIG. 3 is a schematic drawing of a data communications network management system 50 having remote system administration capability, in accordance with a preferred embodiment of the present invention.

The service adapters 52 that are in communication with the services 54 and the control adapters 56 that are in communication with the nodes 58 publish "heartbeat" events on to the information bus 60 at a prescribed interval. The "heartbeat" events are signals received by subscribing entities that indicate that the service or node is operational or "alive" and to periodically report to the subscribing entities other essential sustaining information. The subscribing entities are, generally, the NCCs, such as NCC 62, which subscribe through communication with the database adapters, such as database adapter 64. NCC 62 subscribes to the heartbeat events to show the system administrator that the nodes 58 on which control adapters 56 are running are operational or that services 54 on which service adapters 52 are running are still operational. These heartbeat events are published periodically and the frequency of the heartbeats is configured by a default file or dynamically by NCC 62 by way of a separate "configure" event. An example of the information contained within a heartbeat event includes the Global Unique Identifier (GUID) of the publisher (to identify this particular heartbeat from other service heartbeats), a time stamp, the number of data packets received and processed, the number of packets in queue, the number of packets timed out and the rate at which packets are being received.

When a control adapter 56 stops publishing heartbeats, NCC 62 recognizes that the associated node 58 has stopped and signals the associated master daemon 66 to restart control adapter 56. If master daemon 66 is successful in restarting control adapter 56, then control adapter 56 will once again begin publishing heartbeat events that will be subscribed to by NCC 62. However, if master daemon 66 is continually unsuccessful in its attempt to restart control adapter 56, NCC 62 recognizes the failure by the lack of receipt of heartbeat events. After having not received heartbeat events from control adapter 56 over a pre-defined period, NCC 62 acknowledges continual unsuccessful restart attempts and remotely notifies the system administrator 68 of loss of control adapter 56 heartbeats.

When a service adapter 52 stops publishing heartbeats, the NCC 62 recognizes that the associated service 54 has stopped and signals the associated control adapter 56 to restart the service 54. If control adapter 56 is successful in restarting service 54, then service adapter 52 will once again begin publishing heartbeat events that will be subscribed to by NCC 62. However, if control adapter 56 is continually unsuccessful in its attempt to restart service 54, NCC 62 recognizes the failure by the lack of receipt of heartbeat events. After having not received heartbeat events from service adapter 52 over a predefined period, NCC 62 acknowledges continual unsuccessful restart attempts and remotely notifies the system administrator 68 of loss of service adapter 52 heartbeats.

The system administrator 68 who may be located at a residence 70 or another remote location may be notified of the sustained loss of a heartbeat through the NCC's use of pageable electronic mail (e-mail). NCC 62 may use Simple Mail Transfer Protocol (SMTP) which is a standard e-mail protocol used on the internet and is well known by those of ordinary skill in the art. Additionally, NCC 62 may use Simple Network Management Protocol (SNMP), a widely-used network monitoring and control protocol, to send out SNMP traps. SNMP traps are defined as reports sent to management stations that notify that a certain event has occurred. The use of SMTP and SNMP traps in data communications network management is well known by those of ordinary skill in the art. Other communication media, such as telephone voice mail, facsimile, or the like, may also be used to remotely notify system administrator 68 and are within the inventive concepts herein disclosed.

NCC 62 is configured so that if a heartbeat is not received from a control adapter 56 or service adapter 54 within a predetermined amount of time the system administrator is remotely notified by triggering an e-mail to be sent automatically to system administrator 68 via a paging system. This notification may be sent to system administrator 68 or to numerous other remotely located system administrators. The system administrator 68 is alerted through a script communicated to their page receiving device 72 that the NCC 62 has stopped receiving heartbeats from a control adapter 56 or service adapter 52 and is not responding to restart commands. The system administrator 62 can then use a remote NCC application 74 or interface with the control adapter through Telnet 76. Telnet is a terminal emulation protocol commonly used on the Internet. Telnet allows the user to log onto and run a program from a remote computer or host. Through the use of the remote NCC application 74 or Telnet 76 the system administrator 62 is able to execute restart commands to the failed control adapter 56 or service adapter 52, re-route network traffic to account for the failed node 58/service 54 or take any other appropriate actions to alleviate the network difficulties. The use of the remote NCC application 74 or Telnet 76 allows the system administrator 68 to manage data communications network 50 remotely. System administrator 68 can start, stop and reconfigure the node 58 or service 54 remotely through communication with control adapter 56 or service adapter 52. In this manner, the system administrator 68 is not required to be physically, and constantly, located at the master NCC 62 within the NOC 78 when managing data communications network 50.

Additional events subscribed to by NCC 62 may also trigger remote system administrator notification. An example of such an event would be an "exception" event. The control adapters 56 and the service adapters 52 publish exception events that report to the subscribing NCC 62 the existence of an abnormal condition within the corresponding node 56 or service 54. Each time that an exception condition exists control adapter 56 or service adapter 52 will publish an exception event. Exception events may be classified as either an error, a warning or information only. When the exception event reports an error the error can have a severity level associated with it. The severity level can include, minor, recoverable, severe, critical and unrecoverable. An example of the information found in an exception event includes the GUID of the publisher, the classification of the exception (error, warning or info), the severity level if the classification is an error and a description of the exception condition.

Generally, an information only exception event will not trigger remote system administrator notification, instead this information is stored within database 80 for historical purposes and to analyze performance trends for a particular node or service. Certain warning and error exception types will be self-rectifying and, thus no need will exist to remotely notify system administrator 68. However, if the error exception condition reaches a severity level that requires system administrator 68 to take action or if a warning exception would benefit from proactive response by system administrator 68, then remote notification of system administrator 68 would be desirable.

The user of the network management system described herein will be able to configure NCC 62 in terms of what classification (error, warning, or information only) and level of error exception events (minor, recoverable, severe, critical or unrecoverable) will trigger remote system administrator notification. By way of example, the NCC 62 may receive an exception event from a DHCP service alerting NCC 62 that the request queue is near full capacity. NCC 62 may be configured so that this exception triggers remote system administrator notification. Upon receiving such notification, system administrator 68 can access remote NCC application 74 to send a reconfiguration event that can increase the queue size for that particular DHCP service or they can re-direct the DHCP requests to another DHCP service within the data communications network. The example of an exception event triggering remote system administrator notification is not intended to be limiting. The master NCC 62 can be configured so that other events that it subscribes to will also trigger remote system administrator notification.

Figure 4:
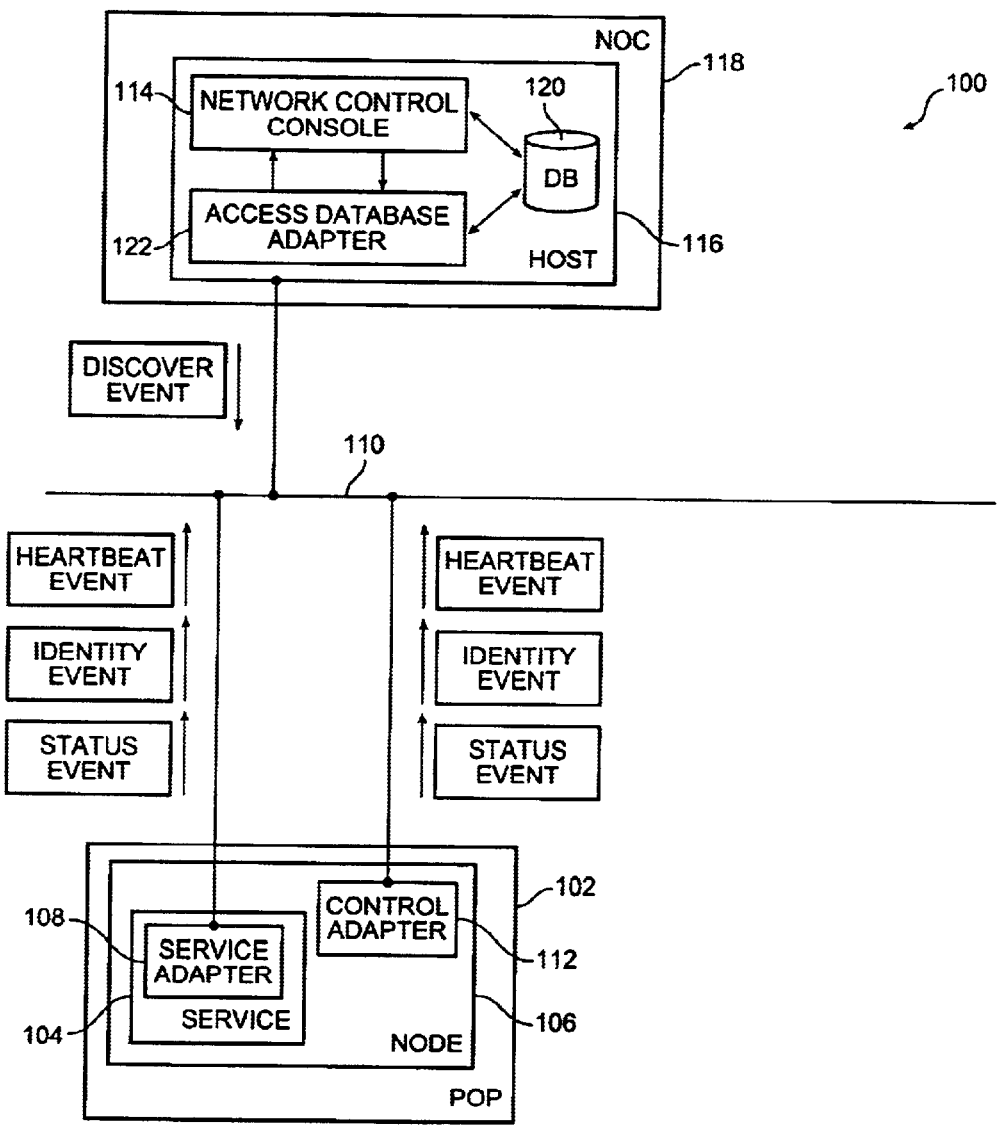
FIG. 4 is a schematic drawing of a management and maintenance system for a data communications network having seamless service and device integration, in accordance with a presently preferred embodiment of the present invention.

FIG. 4 is a schematic drawing of a data communications network management system 100 having the capability to automatically recognize and acquire information from nodes or that are added to the network management system 100 manually, in accordance with a presently preferred embodiment of the present invention. Manually, in this sense, refers to services or nodes running services that are started or added at one of the numerous PoPs in the distributed data communications network without a command to do so being issued from the network management operation center; i.e., network control console 114. By having a data communications network management system that automatically recognizes and acquires information from manually added services and nodes, the management system is not burdened with having system administrators update the system with manual data inputs related to the newly added services.

Within PoP 102, a service 104 or a node 106 running services may be added to a preexisting data communications network. Service 104 may be a new application running on node 106, or it may be an additional device added to the data communications network. Service 104 can be added to the preexisting data communications network management system 100 through an associated service adapter 108 in communication with information bus 110. Node 106 can be added to the preexisting data communications network management system 100 through an associated control adapter 112 in communication with information bus 110. Upon start-up of service 104 or node 106, the associated adapter begins publishing "heartbeat" events. As described above, heartbeat events act as signals to subscribing entities, letting the subscriber know that a service is functional and providing other essential sustaining information (i.e. the number of data packets received and processed since the last heartbeat, the number of packets currently in queue, the number of packets timed out and the rate at which packets are being received). NCC 114 running on host 116 within NOC 118 will subscribe to all heartbeats published within the distributed data communications network that it serves to manage. The heartbeat will be published by the new service 104 or node 106 with a self-generated GUID. When NCC 114 receives the heartbeat and fails to find the GUID in its database 120 it triggers the publication of a "discover" event from the database adapter 122.

A discover event requests that an unknown service or host provide identity information to NCC 114. An example of information contained within a discover event includes the GUID of the publisher, the self-generated GUID of the intended subscriber and status performance data requests. The control adapter 112 associated with the newly added node 106 or the service adapter 108 associated with the newly added service 104 subscribes to this discover event and upon receiving such, responds by publishing an "identity" event. The identity event provides the NCC 114 with detailed information about the service 104 or node 106. An example of information contained within an identity event includes; a time stamp, the GUID of the publisher, pertinent EAI system information, the PoP where the service or node is located, server name, server IP address and memory size. The detailed information found in the identity event can be stored in the database 120 of NCC 114 for future reference. When the discover event includes status performance data requests control adapter 112 or service adapter 108 will respond with a "status" event. The status event provides the NCC 114 with a report of the performance of the node 106 or service 104. An example of information contained within a status event includes; a time stamp, GUID of the publisher, performance data from the source, performance data from the sink, performance data from the protocol handler, and performance data from the facility. The detailed performance information contained within a status event can be stored in the database 120 of NCC 114 for future reference. The information supplied by the status event is used by the system administrator to access the overall performance and reliability of the various nodes and services throughout the data communications network.

Figure 5:
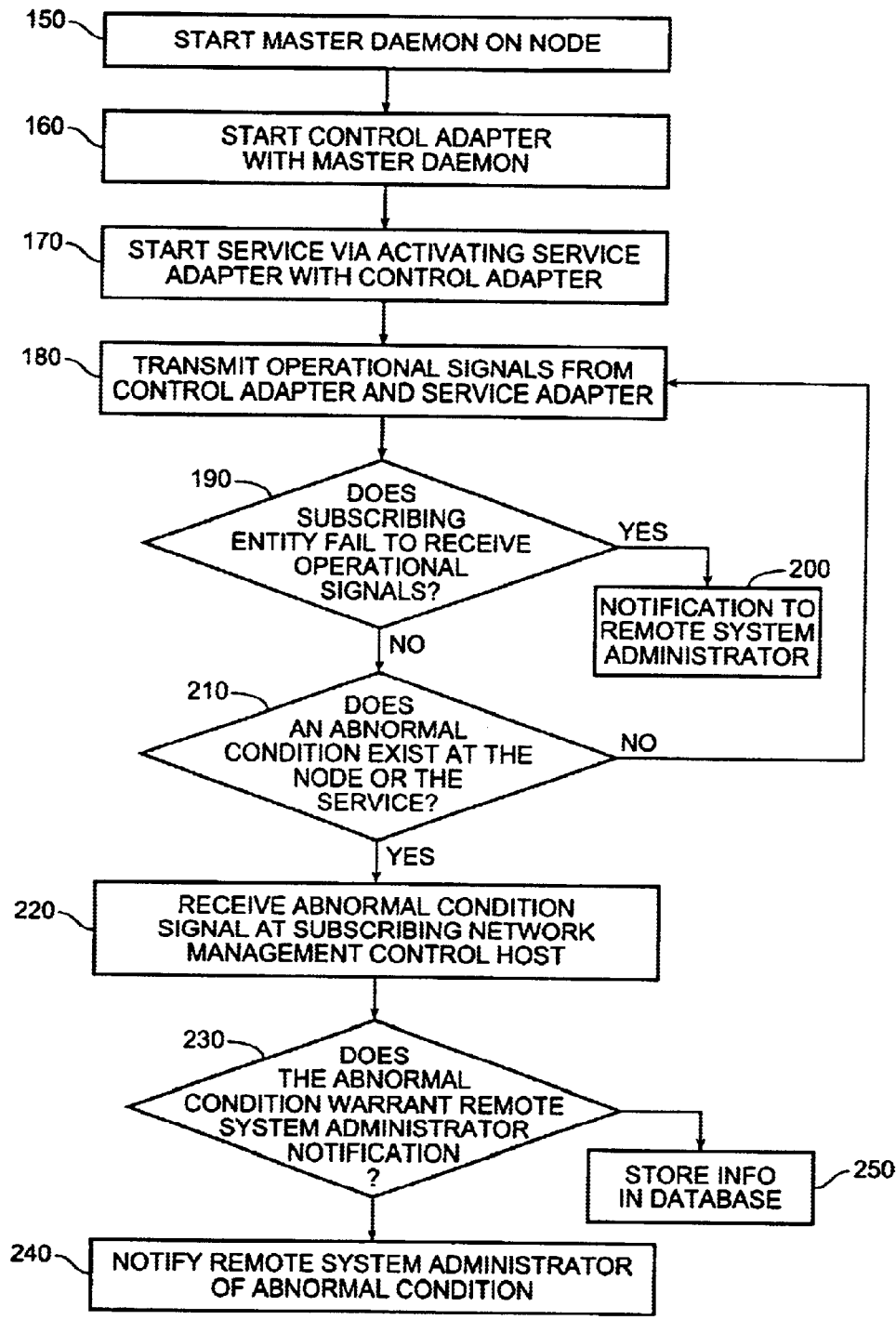
FIG. 5 is a flow diagram of a method for remote management and maintenance of a node within a data communications network, in accordance with a presently preferred embodiment of the present invention.

FIG. 5 is a flow chart diagram illustrating a method for remote management of a node within a data communications network, in accordance with a presently preferred method of the present invention. At 160, the control adapter that will run on the node is started by a master daemon executing a command to start. At 170, the control adapter starts at least one service that is running on the node by activating the service's associated service adapter. The command for the service start process may be found in the control adapter's database or it may come from a signal over the information bus. Examples of services running on the node may include, a protocol gateway service, a DHCP service, a DNS service, an AAA service and a cache service. At 180, the service adapter and the control adapter begin transmitting operational status signals. These signals are published as heartbeat events on to an information bus. Heartbeat events are published at a prescribed interval to alert subscribing entities that a specific node or service is still functional. If, at 190, a subscribing network management control host (i.e. Network Control Console (NCC)) fails to receive operational status signals from a node or service within its management and maintenance system, then, at 200, notification is sent to a remote system administrator. Generally, this notification takes the form of a pageable SMTP e-mail notification. In this instance, the system administrator is capable of receiving notification of a loss of heartbeat regardless of the physical location of the system administrator and take appropriate action at a remote location.

At 190, if the node or service continues sending operational status signals, then, at 210 if an abnormal condition exists at the node or service it will trigger a signal to be transmitted by the associated control adapter or service adapter. These signals are published as exception events on to an information bus. Exception events are classified as information only, warning and error. Error exception events will have severity levels associated with the exception. Exception events are published to alert the subscribing entities of abnormal occurrences within a node or service. If, at 220, a subscribing network management control host receives an exception event it then, at 230, queries a database to see if the specific exception received warrants remote system administrator notification. If the exception event requires remote notification, then, at 240, such notification is sent to the system administrator. Generally, this notification takes the form of a pageable SMTP e-mail notification. In this instance, the system administrator is capable of receiving notification of an abnormal condition regardless of the physical location of the system administrator and take appropriate action at a remote location. If the exception event does not require notification, then, at 250, the information found in the exception event is stored for future reference in the database associated with the network management control host.

Figure 6:
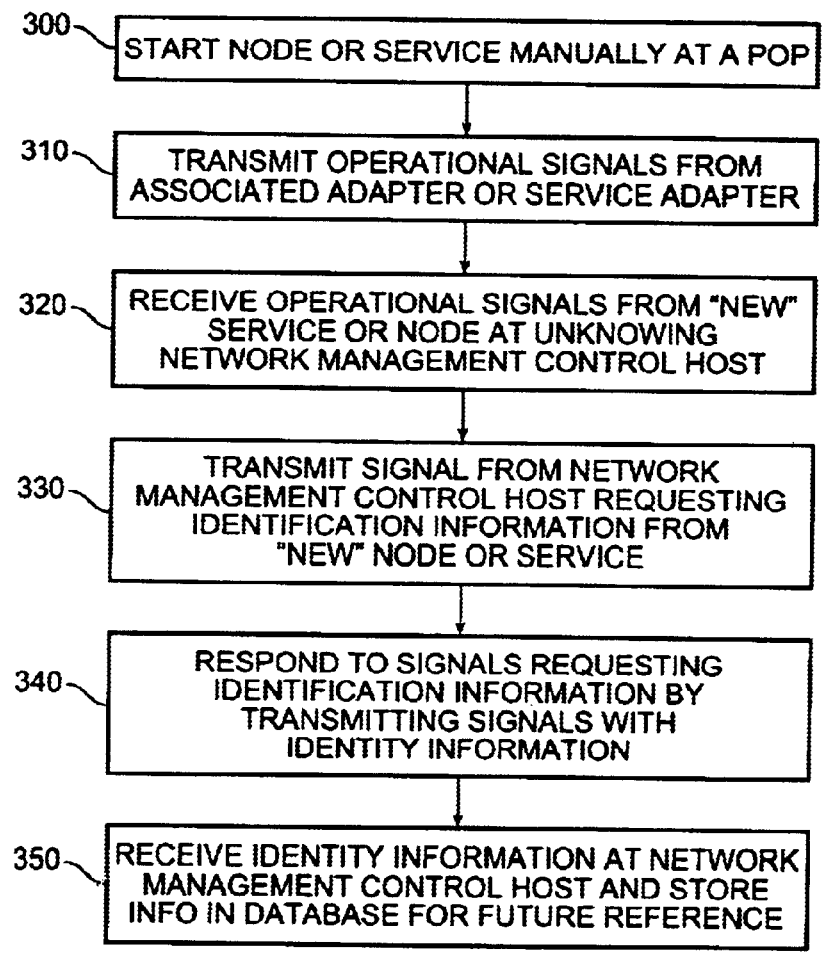
FIG. 6 is a flow diagram of a method for seamless integration of services and devices into a management and maintenance system for a data communications network, in accordance with a presently preferred embodiment of the present invention.

FIG. 6 is a flow chart illustrating a method for seamless integration of a new service or node within a data communications network management system, in accordance with a presently preferred embodiment of the present invention. At 300, a node or service is started manually at a Point of Presence within a data communications network. Manually, in this sense, refers to a service or node that is started or added at one of the numerous PoPs in the distributed data communications network without a command to do so being issued from the network management operation center. The service or node being started has an associated service or control adapter running and is in communication with an information bus. At 310, the newly started node or service begins sending out operational status signals over the information bus. These signals are published as heartbeat events on to an information bus. Heartbeat events are published at a prescribed interval to alert subscribing entities that a specific node or service is still functional.

At 320, these signals are received by an unknowing network management control host. The host has no identity information in its database for this new service or node, therefore, at 330, the network management control host sends out signals requesting identification information. These signals are published as discover events by the database adapter. At 340, these identification request signals are received by the new service or node and the associated control adapter or service adapter sends signals with the requested identification information supplied therein. These events are published as identity events in response to received discover events. At 350, the subscribing network management control host receives the identity information and stores such in its database. The new service or node has now been integrated into the data communications network management system and the identifying information is kept on file for future reference.

Alternative Embodiments

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed is:

1. A method for remote management of a node of a data communications network, the method comprising:

starting a service adapter for each service running on the node, the service adapter publishing first heartbeat events onto an information bus, the first heartbeat events indicating that the service is operational;

starting a control adapter for the node, the control adapter monitoring state and status of the node and being capable of restarting the services, the control adapter publishing second heartbeat events onto the information bus, the second heartbeat events indicating that the node is operational; and subscribing to the first heartbeat events and the second heartbeat events by a database adapter at a network operation center coupled to the information bus.

2. The method in accordance with claim 1, further comprising:

subscribing, at the service adapter, to the second heartbeat events and events published by the database adapter.

3. The method in accordance with claim 1, further comprising:

subscribing, at the control adapter, to the first heartbeat events and events published by the database adapter.

4. The method in accordance with claim 1, further comprising:

periodically polling, by the control adapter, the services; and automatically restarting a service if the service has been failed.

5. The method in accordance with claim 4, further comprising:

publishing, at the control adapter, an exception event onto the information bus after performing said automatically restarting a predetermined number of times.

6. The method in accordance with claim 1, further comprising:

signaling, at the network operation center, the control adapter to restart a service if the first heartbeat events have not been received at the database adapter for a predetermined time period.

7. The method in accordance with claim 6, further comprising:

issuing, at the network operation center, a notification if the first heartbeat events have not been received at the database adapter for a certain amount of time after said signaling.

8. The method in accordance with claim 1, further comprising:

starting a master process associated with the control adapter, the master process capable of starting and restarting said control adapter.

9. The method in accordance with claim 8, further comprising:

signaling, by the network operation center, the master process to restart the control adapter if the database adapter has not received the second heartbeat events for a predetermined time period.

10. The method in accordance with claim 9, further comprising:

issuing, at the network operation center, a notification if the database adapter has not received the second heartbeat events for a certain amount of time after said signaling.

11. The method in accordance with claim 1, further comprising:

publishing, at the service adapter, exception events indicating an abnormal condition in the corresponding service.

12. The method in accordance with claim 11 wherein each of the exception events includes a classification and a level thereof.

13. The method in accordance with claim 12, further comprising:

issuing, at the network operation center, a notification in response to receipt of the exception event based on the classification and the level of the exception event.

14. The method in accordance with claim 1, further comprising:

publishing, at the control adapter, exception events indicating an abnormal condition in the node.

15. The method in accordance with claim 14 wherein each of said exception events includes a classification and a level thereof.

16. The method in accordance with claim 15, further comprising:

issuing, at the network operation center, a notification in response to receipt of the exception event based on the classification and the level of the exception event.

17. A system for remote management of a node of a data communications network, services running on the node, the system comprising:

a service adapter associated with each service running on the node, said service adapter publishing first heartbeat events onto an information bus, the first heartbeat events indicating that the service is operational;

a control adapter running on the node, said control adapter monitoring state and status of the node and being capable of restarting the services, said control adapter publishing second heartbeat events onto the information bus, the second heartbeat events indicating that the node is operational; and a network operation center coupled to the information bus, said network operation center including a database adapter subscribing to the first heartbeat events and second heartbeat events.

18. The system in accordance with claim 17 wherein said service adapter subscribes to the second heartbeat events and events published by said database adapter.

19. The system in accordance with claim 17 wherein said control adapter subscribes to the first heartbeat events and events published by the database adapter.

20. The system in accordance with claim 17 wherein said control adapter periodically polls the services and automatically restarts a service if the service has been failed.

21. The system in accordance with claim 20 wherein said control adapter publishes an exception event onto the information bus after a predetermined number of unsuccessful restart operations for the failed service.

22. The system in accordance with claim 17 wherein said network operation center signals said control adapter to restart the service if said database adapter has not received the first heartbeat events published by the service adapter for a predetermined time period.

23. The system in accordance with claim 22 wherein said network operation center issues a notification if said database adapter has not received the first heartbeat events after a certain amount of time after signaling the service adapter to restart the service.

24. The system in accordance with claim 17, further comprising:

a master process associated with said control adapter, said master process capable of starting and restarting said control adapter.

25. The system in accordance with claim 24 wherein said network operation center signals said master process to restart said control adapter if said database adapter has not received the second heartbeat events for a predetermined time period.

26. The system in accordance with claim 25 wherein said network operation center issues a notification if said database adapter has not received the second heartbeat events after a certain amount of time after signaling said master process to restart said control adapter.

27. The system in accordance with claim 17 wherein said service adapter further publishes exception events indicating an abnormal condition in the corresponding service.

28. The system in accordance with claim 27 wherein each of said exception events includes a classification and a level thereof.

29. The system in accordance with claim 28 wherein said network operation center issues a notification in response to receipt of the exception event based on the classification and the level of the exception event.

30. The system in accordance with claim 17 wherein said control adapter further publishes exception events indicating an abnormal condition in the node.

31. The system in accordance with claim 30 wherein each of said exception events includes a classification and a level thereof.

32. The system in accordance with claim 31 wherein said network operation center issues a notification in response to receipt of the exception event based on the classification and the level of the exception event.

33. A program storage device readable by a machine, tangibly embodying a program of instructions readable by the machine to perform a method for remote management of a node of a data communications network, the method comprising:

starting a service adapter for each service running on the node, the service adapter publishing first heartbeat events onto an information bus, the first heartbeat events indicating that the service is operational;

starting a control adapter for the node, the control adapter monitoring state and status of the node and being capable of restarting the services, said control adapter publishing second heartbeat events onto the information bus, the second heartbeat events indicating that the node is operational; and subscribing to the first heartbeat events and the second heartbeat events by a database adapter at a network operation center coupled to the information bus.

* * * * *